United States Patent [19]

Brannon

[11] Patent Number: 5,326,516
[45] Date of Patent: Jul. 5, 1994

[54] METHOD OF PREPARING A CURED PIGMENTED THERMOSETTING POLYMER COMPOSITION EXHIBITING IMPROVED COLOR VALUES AND REDUCED HAZE

[75] Inventor: Selby M. Brannon, Geneva, Ohio

[73] Assignee: Plasticolors, Inc., Ashtabula, Ohio

[21] Appl. No.: 60,498

[22] Filed: May 10, 1993

Related U.S. Application Data

[63] Continuation of Ser. No. 884,255, May 8, 1992, abandoned, which is a continuation of Ser. No. 609,105, Oct. 31, 1990, abandoned, which is a continuation of Ser. No. 475,766, Feb. 6, 1990, abandoned, which is a continuation-in-part of Ser. No. 416,471, Oct. 3, 1989, abandoned.

[51] Int. Cl.$^5$ .............................. B29C 47/36
[52] U.S. Cl. .................... 264/143; 264/211; 264/211.21; 264/211.23; 264/211.24; 264/255; 264/257; 264/331.18; 264/349; 524/388; 524/529; 525/41; 525/49; 525/935
[58] Field of Search .............. 264/349, 211.23, 211.24, 264/211, 331.18, 257, 255, 142, 143, 211.21; 524/388, 515, 529, 534–535; 525/41, 49, 935

[56] References Cited

U.S. PATENT DOCUMENTS

| | | | |
|---|---|---|---|
| 2,489,226 | 11/1949 | Morris et al. | 524/529 |
| 3,066,112 | 11/1962 | Bowen | 260/41 |
| 3,179,623 | 4/1965 | Bowen | 260/47 |
| 3,256,226 | 6/1966 | Fekete et al. | 260/23.5 |
| 3,284,232 | 11/1966 | Caldwell | 117/138.8 |
| 3,301,743 | 1/1967 | Fekete et al. | 161/194 |
| 3,367,992 | 2/1968 | Bearden | 260/837 |
| 3,503,921 | 3/1970 | Souza, Jr. et al. | 525/49 |
| 3,674,893 | 7/1972 | Nowak et al. | 523/400 |
| 3,701,748 | 10/1972 | Kroekel | 523/523 |
| 3,718,714 | 2/1973 | Comstock et al. | 260/862 |
| 3,772,241 | 11/1973 | Kroekel | 260/40 R |
| 3,801,693 | 4/1974 | Stallings et al. | 264/246 |
| 3,846,223 | 11/1974 | Lederman et al. | 161/162 |
| 3,855,085 | 12/1974 | Rushmere | 204/55 R |
| 3,923,726 | 12/1975 | Benz | 264/78 |
| 3,925,301 | 12/1975 | Engel et al. | 260/42 |

(List continued on next page.)

FOREIGN PATENT DOCUMENTS

| | | | |
|---|---|---|---|
| 0272127 | 6/1988 | European Pat. Off. | |
| 56-120327 | 2/1980 | Japan | |
| 58-180547 | 10/1983 | Japan | 264/331.18 |
| 62-204908 | 9/1987 | Japan | 264/78 |
| 1126017 | 9/1968 | United Kingdom | |
| 1382244 | 1/1975 | United Kingdom | |
| 1406229 | 9/1975 | United Kingdom | 264/255 |

OTHER PUBLICATIONS

Tadmor, Z. and Gogos, C., Principles of Polymer Processing, John Wiley & Sons, Inc., 1979, pp. 3–10, 452–461.

Primary Examiner—Jeffery Thurlow
Attorney, Agent, or Firm—Renner, Otto, Boisselle & Sklar

[57] ABSTRACT

This invention relates to a process for preparing a pigmented thermoplastic polymer composition which is useful as a low profile additive composition for thermosetting resins. The process includes the steps of (A) selecting at least on thermoplastic polymer having a refractive index which is within about 0.06 units of the refractive index of the thermosetting resin;

(B) preparing a mixture of said thermoplastic polymer and at least one color pigment, dye or mixture thereof under high shear in a high-intensity mixer; and (C) forming a slurry containing said mixture obtained in step (B) in at least one liquid copolymerizable monomer containing at least one $CH_2{=}C{<}$ group. In a preferred embodiment, at least one surfactant is included in the slurry obtained in step (C) in an amount sufficient to enhance the uniformity of the pigmentation of a cured composite produced from the thermosetting resin composition and a low profile additive composition. Additional pigment can be added to the slurry before the slurry is mixed with the thermosetting resin. The cured composites produced from the thermosetting resin composition and the low profile additive composition of the invention are characterized has having improved uniformity and intensity of color.

22 Claims, No Drawings

U.S. PATENT DOCUMENTS

| | | | |
|---|---|---|---|
| 3,933,689 | 1/1976 | Ray et al. | 106/47 |
| 4,009,225 | 2/1977 | Maxel | 264/331.18 |
| 4,113,822 | 9/1978 | Takiura et al. | 264/349 |
| 4,141,929 | 2/1979 | Stoops et al. | 260/862 |
| 4,145,381 | 3/1979 | Roberts et al. | 525/193 |
| 4,188,316 | 2/1980 | Sawada | 260/40 R |
| 4,255,524 | 3/1981 | Dawans et al. | 524/529 |
| 4,267,229 | 5/1981 | Knight et al. | 264/331.18 |
| 4,367,192 | 1/1983 | Arnason | 264/300 |
| 4,474,473 | 10/1984 | Higuchi et al. | 366/75 |
| 4,524,043 | 6/1985 | McDougal | 264/331.18 |
| 4,532,297 | 7/1985 | Gardner | 525/49 |
| 4,555,534 | 11/1985 | Atkins | 523/507 |
| 4,720,516 | 1/1988 | Kishida et al. | 523/445 |
| 4,727,096 | 2/1988 | Choulin | 523/217 |
| 4,959,189 | 9/1990 | Rohrbacher et al. | 264/135 | ns.

METHOD OF PREPARING A CURED PIGMENTED THERMOSETTING POLYMER COMPOSITION EXHIBITING IMPROVED COLOR VALUES AND REDUCED HAZE

This is a continuation of co-pending application Ser. No. 07/884,255 filed on May 8, 1992, which is a continuation of 07/609,105 Oct. 31, 1990, which is a continuation of 07/475,766 Feb. 6, 1990, which is a continuation-in-part of 07/416,471 Oct. 3, 1989, all abandoned.

TECHNICAL FIELD

This invention relates to pigmented thermoplastic polymer compositions and to the use of such pigmented thermoplastic polymer compositions as low profile additives for coloring thermosetting resin systems. The invention relates more particularly to pigmented thermoplastic polymer compositions as low profile additives for thermosetting resin systems wherein the refractive index of the thermoplastic resin is within about 0.06 units of the refractive index of the thermosetting resin.

BACKGROUND OF THE INVENTION

Thermosetting resins, particularly unsaturated polyester resins containing fillers and reinforcements have been used for premix, transfer molding, compression molding, injection molding, and mat and preform molding. Although polyester resins generally perform satisfactorily in the above-molding processes, the resins are subject to several deficiencies. Parts molded from polyester resins are subject to shrinkage and warpage upon cooling, and often the molded product exhibits surface waviness, roughness and sink markings, especially when the articles have relatively intricate shapes and sections of varying thickness.

Various suggestions have been made in the art for improving the surface characteristics (also called low profile characteristics) of polyester resins. The automotive industry's need for thinner, smoother and tougher low profile sheet molding compound (SMC) composites for body panel parts has created an even greater interest in overcoming the shrinkage problems of thermosetting resins such as polyester resins. One proposed solution to the shrinkage problem is the inclusion of additives in the polyester resin which are believed to expand as the polyester resin is cured thereby minimizing and/or offsetting the shrinkage of the polyester. Such additives are generally referred to in the art as "low profile additives" since they improve the low profile characteristics of the cured polyester resin. In other words, low profile additives have been added to unsaturated polyester compositions for the purpose of obtaining compositions which can be molded to thermoset articles having surfaces which truly reflect the surfaces of the mold.

A number of the low profile additives which have been suggested for improving the surface properties of polyester resins are thermoplastic resins such as polymethylmethacrylates, polystyrenes, and other polymers derived from compounds containing a polymerizable olefinic group. U.S. Pat. No. 3,503,921 describes a polyester premix containing polystyrene and monomeric styrene. These compositions are described as providing a polyester resin system which, when molded exhibits relatively low shrinkage, non-warp, and improved surface characteristics.

U.S. Pat. No. 3,674,893 describes the modification of an unsaturated vinyl ester thermosetting resin by inclusion of a copolymerizable monomer and unsaturated polydiene rubbers such as styrene-butadiene copolymers. Such resin mixtures are reported to provide improvements in one or more properties of impact strength, stability, paintability, surface smoothness and uniformity of pigmentation in reinforced molded articles prepared therefrom.

U.S. Pat. Nos. 3,701,748 and 3,772,241 describe unsaturated polyester resin compositions containing a monomer having an olefinic group copolymerizable with the unsaturated polyester, and a thermoplastic polymer which is soluble in the monomer, but when present during the copolymerization of the unsaturated polyester in the monomer, yields an optically heterogeneous cured composition. It is reported that through the use of the specific combinations of the three components, the overall polymerization shrinkage is at most very low. Fibrous reinforced articles prepared from such modified unsaturated polyesters are characterized by smooth surfaces.

U.S. Pat. No. 3,718,714 also relates to unsaturated polyester compositions containing a thermoplastic polymer. In this patent, the thermoplastic polymer is a polymer of vinyl acetate having an average of at least one carboxyl group per molecule. Such modified compositions have particular utility in sheet molding applications to form thermoset articles characterized by excellent impact strength and by excellent surface properties.

The use of low profile additives for improving the surface characteristics of cured thermosetting resins such as unsaturated polyester resins is not problem-free. One of the difficulties which arises from the preparation of a mixture of a thermosetting resin such as the polyester resin and a thermoplastic resin composition is that the thermosetting resins and the thermoplastic resins generally are immiscible and result in the formation of a two-phase system. Although techniques have been developed in the art for satisfactorily handling two-phase systems, particular problems have been observed when it is desired to prepare colored or pigmented molded articles from such two-phase systems. Normally, color pigments are utilized to produce the desired color to the molded article. In these types of systems, color pigments appear to have a different affinity for thermosetting resins than the thermoplastic resins, and thus, the distribution of the color pigments in the molded articles is not always as uniform as desired. Also in the finished product, there is a haze caused by the differences in the index of refraction of the different resins.

U.S. Pat. No. 4,555,534 describes a process for improving the uniformity of pigmentation in thickenable low shrink polyester molding compositions. The improved pigmentation in the thickenable polyester molding compositions containing a carboxylated vinyl ester polymer low profile additive is achieved either by incorporating a surfactant in the composition, by using as the low profile additive, a vinyl acetate/maleic acid copolymer, or by a combination of the two methods. A wide variety of surface active compounds are disclosed as being useful, and as a general rule, the ionic surface active compounds are reported as giving the best results.

SUMMARY OF THE INVENTION

This invention relates to a process for preparing a pigmented thermoplastic polymer composition which is useful as a low profile additive composition for thermosetting resins. The process comprises the steps of
(A) selecting at least one thermoplastic polymer having a refractive index which is within about 0.06 units of the refractive index of the thermosetting resin;
(B) preparing a mixture of said thermoplastic polymer and at least one color pigment, dye or mixture thereof under high shear in a high-intensity mixer; and
(C) forming a slurry comprising said mixture obtained in step (B) in at least one liquid copolymerizable monomer containing at least one $CH_2=C<$ group. In a preferred embodiment, at least one surfactant is included in the slurry obtained in step (C) in an amount sufficient to enhance the uniformity of the pigmentation of a cured composite produced from the thermosetting resin composition and a low profile additive composition. In another embodiment, additional color pigment is added to the slurry before the slurry is mixed with the thermosetting resin. The cured composites produced from the thermosetting resin composition and the low profile additive composition of the invention are characterized as having improved uniformity and intensity of color.

DESCRIPTION OF THE PREFERRED EMBODIMENTS

In the present invention, it has been discovered that the desired improvement in the uniformity and intensity of the color in cured pigmented polymer compositions obtained by curing a mixture of a thermosetting resin and a low profile additive composition comprising at least one thermoplastic polymer is desirably improved when the thermoplastic polymer selected for use has a refractive index which is within about 0.06 units of the refractive index of the thermosetting resin. A syrup comprising of the thermoplastic polymer dissolved in a suitable monomer, is the usual method of introducing the thermoplastic polymer into the thermoset composition. However, the thermoplastic polymer may not be completely untangled or extended. When this occurs, it is difficult or impossible to bring the pigment into intimate contact with the thermoplastic polymer as the pigment is added to the syrup. Intimate contact or bonding can be achieved by pigmenting the thermoplastic polymer, under shear, prior to preparing the syrup. This step insures that the thermoplastic phase will remain pigmented.

Any of the thermoplastic polymers which have been suggested in the prior art as being useful low profile additives for thermosetting resins may be utilized in the compositions of this invention provided that the thermoplastic polymers satisfy the refractive index requirements of the invention. Examples of the various types of thermoplastic polymers which can be used in this invention provided they meet the refractive index requirement include polyolefins and polyolefin blends, styrene block copolymers, elastomeric polyurethanes, thermoplastic polyesters and copolyesters having alternate hard and soft segments, nylon elastomers, polyetheramides, polyesteramides, etc., all of which are well known to those skilled in the polymer art.

Preferably, the thermoplastic polymers are polymers derived from compounds or mixtures of compounds having a polymerizably reactive $CH_2=C<$ group. Thermoplastic polymers useful in the present invention include, for example, homopolymers of methyl methacrylate, ethyl methacrylate, butyl methacrylate, methyl acrylate, ethyl acrylate, styrene, vinyl toluene, and other alkyl-substituted styrene copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxy ethyl methacrylate, styrene, 2-ethylhexyl acrylate, acrylonitrile, methacrylic acid, methacrylamide, methylol acrylamide and cetyl stearyl methacrylate. Additional examples of thermoplastic polymers useful in the invention are styrene/acrylonitrile copolymers, vinyl chloride/vinyl acetate copolymers, cellulose acetate butyrate and cellulose acetate propionate.

The thermoplastic polymers which can be utilized in the preparation of the pigmented thermoplastic polymer compositions of the present invention also may be polymers of vinyl acetate containing an average of at least one carboxyl group per molecule. Generally an average of 1 to about 10 and more preferably an average of from about 1 to about 3 carboxyl groups are present per molecule. On a weight basis, suitable thermoplastic polymers contain about 0.2 to about 5% by weight, preferably about 0.5 to about 2% by weight combined "carboxyl" compound.

The thermoplastic polymers may also be polyalkylene terephthalate polymers such as polyethylene terephthalate and polypropylene terephthalate. These polymers are commercially available.

The thermoplastic polymers also may be chlorinated polyolefins such as chlorinated polyethylene, chlorinated polypropylene, mixtures of chlorinated polyethylene and chlorinated polyolefin, etc. Sulfonated polyolefins such as sulfonated polyethylenes and sulfonated polypropylenes also are useful. Sulfonated polyolefins are available commercially.

Chlorosulfonated polyolefins such as chlorosulfonated polyethylene and chlorosulfonated polypropylene also may be utilized. Commercially available chlorosulfonated polyethylenes are available from the DuPont Company under the general trade designation Hypalon Synthetic Rubber.

Chlorosulfonated olefins such as chlorosulfonated polyethylenes are derived from the reaction of a mixture of chlorine and sulfur dioxide on any of the various polyethylenes. The product of this reaction is a chemically modified form of the original polyethylene, and the product may contain from 20% to about 40% chlorine and about 1% to 2% sulfur present mostly as secondary sulfonyl chloride groups ($RR'CHSO_2Cl$). The sulfonyl chloride groups are available as cross-linking or curing sites.

The thermoplastic polymer also may be any of the polydiene rubbers known in the art including homopolymers and copolymers of conjugated diene monomers such as butadiene. Copolymers include polymers containing diene monomer with the balance comprising at least one other copolymerizable monomer such as styrene or acrylonitrile. Specific examples of conjugated diene monomers include butadiene, isoprene, chloroprene, and various halo and lower alkyl-substituted derivatives thereof, etc. Polybutadiene is a preferred polydiene.

Examples of copolymerizable monomers useful with said diene monomers include nitrile monomers such as acrylonitrile, methacrylonitrile, etc., and alkenyl aromatic monomers such as styrene, alpha-methyl styrene, the halo and alkyl-substituted styrenes such as chloro styrene, vinyl toluene, or t-butyl styrene, etc. Preferred copolymers include styrene-butadiene copolymers including block copolymers thereof. Specific examples of commercially available polydiene rubber-type modifiers useful as low profile additives for sheet molding compounds include: butadiene polymers such as K-Resin from Phillips 66 and Chemigum from Goodyear Tire and Rubber, Chemical Division; and the styrene/-butadiene block copolymers available from the Shell Chemical Company under the general trade designations Kraton® GX1855 and DX1300. Both of these rubber compositions from Shell are styrene-butadiene block copolymers which are dissolved in styrene and the solution is used to modify the properties of sheet molding compounds formulated from unsaturated polyesters.

Mixtures of two or more thermoplastic polymers having the desired refractive indices can be utilized as a low profile additive thermoplastic polymer composition. For example, the low profile additive component may comprise a mixture of neoprene rubber and a chlorosulfonated polyethylene such as Hypalon-45 in a ratio of 85:15. In another example, the thermoplastic component may comprise a mixture of Neoprene W and sulfonated polyethylenes such as Hypalon-45 and other Hypalon materials from DuPont.

After the thermoplastic polymer composition is selected for the low profile additive, a mixture of said thermoplastic polymer and at least one color pigment, dye or mixture thereof is prepared under high shear in a high intensity mixer. More particularly, the high intensity mixer is one in which the thermoplastic polymer composition is heated to a temperature sufficient to melt the thermoplastic composition whereupon the color pigment, dye or mixture is thoroughly mixed into the melted thermoplastic polymer composition under high shear and high intensity conditions. Any mixer capable of providing the desired high shear and high intensity mixing at polymer melt temperatures can be utilized in preparing the mixtures. Specific examples of useful high intensity mixers include extruders, two-roll mills, Banbury mills, etc. Extruders, including single screw and twin screw extruders are particularly preferred for preparing the thermoplastic polymer-color pigment mixtures useful in the low profile additives of the present invention.

The high shear energy in the high intensity mixer is accomplished generally by having a surface within the high intensity mixer moving at a high rate of speed with respect to the particles and liquid within the mixer. The high shear energy which is applied to the particles and liquid in the high intensity mixers in accordance with the process of the present invention is sufficient to deagglomerate the solid particles such as pigment particles, but generally there is no significant change in the size of the original primary particle. The high shear energy generally raises the temperature of the mixture. The time of mixing varies and depends on the type of pigment particles, the type of polymer, speed of mixer, ratio of polymer to pigment, etc. Precise times of mixing can be readily determined by one skilled in the art with a minimum of experimentation taking into consideration the above factors.

The color pigments may be organic pigments and/or inorganic pigments. Any of the color pigments normally used in polymeric compositions can be used in the preparation of the pigmented thermoplastic polymer compositions of the present invention, and the choice of pigment or pigments will depend upon the particular color or colors desired in the molded products. The amount of pigment included in the pigmented thermoplastic polymer compositions of the present invention may vary over a wide range, and the particular amounts utilized in any particular application can be readily determined by one skilled in the art. Generally, the pigmented thermoplastic polymer compositions of the invention contain from about 1 to about 40% by weight and preferably from about 10 to about 30% by weight of the pigment.

Carbon blacks are well known color pigments often utilized in polymer formulations. Among the carbon blacks which may be utilized as color pigments in the present invention are furnace blacks, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, medium processing channel blacks and conductive blacks. Other carbon blacks which may be utilized include acetylene blacks. Mixtures of two or more of the above blacks can be used in comparing the pigmented compositions of the present invention.

The term "pigment" or "color pigment" as used in the specification and claims also include some colorant materials which are sometimes referred to as fillers in polymers, and these include metal powders, metal oxides and other inorganic compounds such as barium sulfate. Metal powders such as aluminum or bronze may be utilized as pigments to produce desired colors as well as provide other properties including improved thermal properties and electrical conductivity. Among the metallic oxides which can be utilized as pigments are zinc oxide, aluminum oxide, magnesium oxide, iron oxide red, iron oxide yellow, chrome oxide green, and titanium oxide white. Other inorganic pigments which are utilized to provide the desired colors include zinc sulfide, cadmium sulfoselenide, cadmium mercury, zinc chromate, cobalt aluminate, chrome cobaltalumina, ultramarine blue and lead carbonate.

A wide variety of organic pigments can be utilized as colorants in polymeric materials, and any of the known organic pigment colorants can be utilized in the present invention. Some typical organic pigment colorants include Para Red, Lithol Rubine, Hello Bordeaux, Thio Indigo, Thio Indigoid, Toluidine, Dioxazine, Red Lake C, Red Lake R, Pyrazolone Red, Anthraquinone, Isoindolinone, Perylene, Benzidene Yellow Anilide, Benzidene Yellow Xylidide, Benzidene Yellow Anisidide, Flavanthrone, Phthalocyanine Blue, Phthalocyanine Green, Pigment Green B, Azo, etc.

The pigments may be introduced either neat or as mixtures in polyols or polyesters. Mixtures of pigments can be prepared in, for example, ethylene glycol, diethylene glycol, 1,2-propanediol, 1,3-propanediol, 1,4-butanediol or 1,6-hexanediol. Mixtures of the glycols also may be utilized. Low molecular weight polyesters are preferred liquids for preparing the pigment mixtures. Low molecular weight esters of phthalic acids and glycerols are examples of useful liquids.

The amount of pigment(s) contained in the above mixtures of pigment and polyols or polyesters may be varied over a wide range, and the mixture generally will contain from about 5 to about 90% by weight of the pigments or mixtures of pigments and from about 10 to 95% by weight of the polyol or polyester. More often the mixture will comprise about 50 to 90% of the pigment and 10 to 50% of the polyol or polyester.

A wide variety of dyes and combinations of dyes can be utilized in the present invention, and the choice of any particular dye or dye combinations (and the amounts thereof) can be determined by one skilled in the art depending on the particular thermoplastic polymer (and thermosetting polymer) and the color desired in the final product. The dyes may be any of the solvent, disperse and/or vat dye classes including the azo dyes, disazo dyes, the anthraquinone dyes, the pyrazalone dyes, the quinophthalone dyes, the phthalocyanine dyes and metal complex dyes. Examples of such dyes would include, but are not limited to the following:
Solvent Black 3
Solvent Black 7
Solvent Blue 70
Solvent Blue 101
Solvent Blue 59
Solvent Blue 36
Solvent Green 2
Solvent Green 20
Solvent Green 24
Solvent Green 25
Disperse Orange 25
Solvent Orange 3
Solvent Orange 56
Solvent Red 1
Disperse Red 22
Solvent Red 24
Solvent Red 111
Solvent Red 210
Vat Red 1
Vat Red 41
Solvent Yellow 13
Solvent Yellow 30
Solvent Yellow 33
Solvent Yellow 14
Solvent Yellow 16
Solvent Yellow 129
Solvent Violet 13
Solvent Violet 14

The above dye types are available from a variety of commercial sources under a variety of names. For example, Solvent Red 24 is available from BASF under the designation Sudan Red 380; a Solvent Blue 35 is available from BASF under the designation Sudan Blue 670; a Solvent Yellow 13 is available as Thermoplast Blue 684; and a Solvent Yellow 14 is available as Sudan Orange 220.

The mixtures of thermoplastic polymers and at least one color pigment, dye or mixtures of pigments and dyes which are prepared in the high intensity mixer as described above are then combined with at least one liquid copolymerizable monomer or a mixture of monomers containing at least one polymerizably-reactive $CH_2=C<$ group per molecule. The liquid copolymerizable monomer generally is one in which the thermoplastic polymer can be solubilized or comingled thereby resulting in a slurry of the thermoplastic polymer, the copolymerizable monomer and the pigment, dye or mixture of pigment and dye. When such slurries are eventually combined with a thermosetting polymer in one aspect of the present invention, the liquid monomer is copolymerizable with the thermosetting resin (e.g., the unsaturated polyester) and develops therewith a cross-linked or thermoset structure.

Illustrative of suitable polymerizable ethylenically unsaturated monomers are the vinyl monomers having the formula $$CH_2=CH-R \qquad (I)$$

wherein R is a group having an unsaturated carbon-to-carbon, carbon-to-oxygen, or carbon-to-nitrogen group in conjunction with the vinyl group. Thus, the R groups may be aryl, ketonic, heterocyclic, nitrile, carbalkoxy, carboxy and amido. Specific vinyl monomers include the following:

wherein R is ketonic; ethyl vinyl ketone, n-propyl vinyl ketone, phenyl vinyl ketone and the like;

wherein R is heterocyclic; vinyl pyridine, vinyl quinoline, vinyl pyrrole, vinyl carbazole, vinyl thiophene and the like;

wherein R is nitrile; acrylonitrile and the like;

wherein R is amido; acrylamide, bicycloheptylacrylamide, diacetoneacrylamide and the like;

wherein R is carboxy; acrylic acid and the like;

wherein R is carbalkoxy; methyl acrylate, butyl acrylate, octyl acrylate, lauryl acrylate, cyclohexyl acrylate, phenyl acrylate, benzyl acrylate and the like.

A variety of copolymerizable monomers of the type represented by Formula (I) are available and suitable for preparing the pigmented thermoplastic polymer compositions of the invention. These include alkenyl aromatic monomers, alkyl esters of acrylic acid and methacrylic acid, vinyl acetate, acrylonitrile, diallyl malonate, diallyl phthalate, acrylic and methacrylic acid, and mixtures thereof. Generally preferred are the alkenyl aromatic monomers such as styrene, alpha-methyl styrene, vinyl toluene, alkyl-substituted styrenes such as t-butyl styrene, halogen-substituted styrenes, etc.

The amount of ethylenically unsaturated monomer included in the pigmented thermoplastic polymers can vary over wide limits, and, as mentioned earlier, may be omitted completely. Preferably, however, pigmented thermoplastic polymer compositions contain from about 10% to about 70% by weight of the copolymerizable liquid monomer. Larger or lesser amounts may be utilized to modify the viscosity of the mixture.

In one preferred embodiment, the pigmented thermoplastic polymer composition prepared in accordance with the process of the present invention also contain at least one surfactant. Accordingly, the process may involve an additional step wherein (D) at least one surfactant is included in the slurry prepared in step (C) or added to the slurry obtained in step (C) in an amount sufficient to enhance the uniformity of the pigmentation of a cured composite produced from the thermosetting resin composition and the low profile additive composition. The surfactants may be nonionic surfactants, anionic surfactants, and/or cationic surfactants. In one preferred embodiment, the surfactant is a mixture of at least on nonionic surfactant, at least one cationic surfactant and at least one anionic surfactant. The surfactants which are utilized in the process and in the compositions of the present invention are known in the art, and many of these are described in McCutcheon's "Detergents and Emulsifiers", 1979, North American Ed. published by McCutcheon's Division MC Publishing Corp., Glen Rock, N.J., pp. 15–21 which lists a number of commercially available anionic, nonionic and cationic surfactants by trade name. A description of the various surfactants listed alphabetically by trade name begins on page 42. The surfactants may be added to the mixture as the slurry (C) is formed, or the surfactants may be added to the slurry after it is formed in step (C).

In general, nonionic surfactants such as those containing ether linkages are useful in the polymer compositions of the invention. Examples of such ether-containing surfactants are those having the general formula $$R_1-O-[(CH_2)_nO]_xH \qquad (II)$$

wherein $R_1$ is an aryl or alkyl group containing from about 6 to about 20 carbon atoms, n is 2 or 3, and x is an integer between 2 and 100. Such surfactants are produced generally by treating fatty alcohols or alkyl-substituted phenols with excess ethylene oxide or propylene oxide. The alkyl carbon chain may contain from about 14 to about 24 carbon atoms and may be derived from a long chain fatty alcohol such as oleyl alcohol or stearyl alcohol.

Nonionic polyoxyethylene compounds of this type are described in U.S. Pat. No. 3,855,085. Such polyoxyethylene compounds are available commercially under the general trade designations "Surfynol" by Air Products and Chemicals, Inc. of Allentown, Pa., and under the designation "Pluronic" or "Tetronic" by BASF Wyandotte Corp. of Wyandotte, Mich. Examples of specific polyoxyethylene condensation products include "Surfynol 465" which is a product obtained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene oxide. Also useful is Atlox 1045A from ICI America, Inc. which is a polyoxyalkylene sorbitol oleate-laurate mixture.

Nonionic surfactants also are available from Rohm & Haas Company under the general trade designation "Triton". For example, Triton CF10 is an alkyl aryl polyether.

Amine, long chain fatty amine, long chain fatty acid, alkanol amines, diamines, amides, alkanol amides and polyglycol-type surfactants known in the art are also useful. One type found particularly useful is the group obtained by the addition of a mixture of propylene oxide and ethylene oxide to diamines. More specifically, compounds formed by the addition of propylene oxide to ethylene diamine followed by the addition of ethylene oxide are useful and are available commercially from BASF Wyandotte Inc. Chemical Company under the general trade designation "Tetronic".

Carbowax-type wetting agents which are polyethylene glycols having different molecular weight also are useful. For example, Carbowax No. 1000 has a molecular weight range of from about 950 to 1050 and contains from 20 to 24 ethoxy units per molecule. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilized as surfactants in the compositions of the invention.

Anionic surfactants also may be included in the polymer compositions of the invention. Among the useful anionic surfactants are the widely-known metal carboxylate soaps, organo sulfates, sulfonates, sulfocarboxylic acids and their salts, and phosphates. Various anionic surfactants are readily available commercially, and further information about anionic surfactants can be found in the text "Anionic Surfactants" Parts II and III, edited by W. M. Linfield, published by Marcel Dekker, Inc., New York, 1976. Examples of anionic surfactants available from ICI America, Inc. include Atlas G-2205 which is an aromatic phosphate and Atlas G-3300 which is an alkyl aryl sulfonate. Examples of anionic surfactants available from Rohm & Haas Company include Triton 770 which is a dioctyl sodium sulfosuccinate, Triton H-55 which is a phosphate surfactant, potassium salt, Triton W-30 and Triton X200 which are sodium salts of alkyl aryl polyether sulfonates, etc. An example of an anionic surfactant available from Witco Corporation is Witconate P1059 which is a hydrocarbon soluble isopropylamine salt of dodecyl benzene sulfonic acid.

The cationic surfactants which can be utilized in the compositions and process of the present invention include surfactants such as those which can be prepared by condensing various amounts of ethylene oxide with primary fatty amines which may be a single amine or a mixture of amines such as are obtained by the hydrolysis of tallow oils, sperm oils, coconut oils, etc. Specific examples of fatty acid amines containing from 8 to 22 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine. A number of such alkoxylated amines are commercially available from a variety of sources. For example, a number of cationic surfactants are available under the general trade designation "Ethomeen". Specific examples of such products include "Ethomeen C/15" which is an ethylene oxide condensate of a coconut fatty acid containing about 5 moles of ethylene oxide; "Ethomeen C/20" and "C/25" which are also ethylene oxide condensation products from coconut fatty acids containing about 10 and 15 moles of ethylene oxide respectively; "Ethomeen S/15" which is an ethylene oxide condensation product with stearyl amine containing 5 moles of ethylene oxide; etc. Other examples of cationic surfactants useful in the present invention include surfactants available from Byk Chemie under the designations W971 and Byk 160.

As mentioned above, the amount of surfactant or surfactants included in the process and compositions of the present invention is an amount which is effective in improving the uniformity of the pigmentation of cured composites produced from the thermosetting resin composition and a low profile additive composition described herein. Normally, the pigmented thermoplastic compositions of the present invention will contain from about 0.1 to about 5 or 10% by weight of the surfactant or combinations of surfactants.

The following examples illustrate the process for preparing pigmented thermoplastic polymer compositions in accordance with the present invention. Unless otherwise indicated in these examples and elsewhere in the specification and claims, all parts and percentages are by weight, all temperatures are in degrees Centigrade, and pressures are at or near atmospheric.

EXAMPLE TP-1

A mixture of 15 parts by weight of carbon black and 85 parts by weight of polystyrene is prepared under high shear and high-intensity conditions in an extruder at a temperature sufficient to melt the polystyrene. A portion (30 parts by weight) of the solid elastomer obtained from the extruder is mixed with 70 parts of liquid styrene monomer to form the desired slurry.

EXAMPLE TP-2

The procedure of Example TP-1 is repeated, and 2 parts of a cationic surfactant (Byk Chemie W971) are added per 98 parts of the slurry.

EXAMPLE TP-3

Carbon black (70 parts by weight) is wetted with 30 parts by weight of a low molecular weight grinding vehicle such as a low molecular weight polyester resin. A portion of the wetted carbon black (25 parts) is mixed with 64 parts of neoprene and 11 parts of Hypalon-45 (a chlorosulfonated polyethylene from DuPont) in a single screw extruder at a temperature sufficient to melt the neoprene and the Hypalon and to thoroughly mix the carbon black into the elastomer mixture under high shear conditions. A slurry is then prepared comprising 30 parts by weight of the elastomer recovered from the extruder and 70 parts by weight of styrene monomer by mixing in a suitable vessel. As the slurry is being prepared, about 2 parts by weight of a cationic surfactant (Byk W971) are added, and the slurry is recovered.

EXAMPLE TP-4

The procedure of Example TP-3 is repeated except that the following surfactants and amounts are added to 97 parts of the slurry: 1.20 parts of Nuosperse 657, a nonionic surfactant from Hüls America; 1.05 parts of anionic surfactant 2300 K-2 from Pflaumer Brothers; and 0.75 parts by weight of Byk W971.

EXAMPLE TP-5

Carbon black (70 parts) is wetted with 30 parts of low molecular weight polyester resin, and 25 parts of this wetted carbon black is mixed with 75 parts of an elastomer mixture in an extruder at a temperature sufficient to melt the elastomers. The elastomer mixture comprises 35 parts of Neoprene W, 30 parts of Kraton 1701, 30 parts of Kraton 1300 and 5 parts of Hypalon-45. The wetted carbon black and the elastomer mixture are thoroughly mixed in a single screw extruder under high shear and high intensity conditions. The extrudate is cooled, and a slurry is prepared comprising 30 parts of the extrudate and 70 parts of liquid styrene monomer by thoroughly mixing the extrudate in the monomer. To 97 parts of the slurry, there are added 0.7 part of Byk W971, 0.9 part of surfactant 2300 K-2 and 1.1 part of Nuosperse 657. The desired slurry is recovered.

EXAMPLE TP-6

The procedure of Example TP-5 is repeated except that to 91.44 parts by weight of the slurry (containing the surfactants) there are added 8.56 parts by weight of carbon black, and the slurry is stirred.

The pigmented thermoplastic polymer compositions of the present invention which are prepared as described above are useful particularly as low profile additives for thermosetting resin formulations and for coloring said polyester formulations. When incorporated into thermosetting resins, the pigmented thermoplastic polymer compositions of the present invention improve the uniformity of color and reduce the haze of molded products prepared from such modified thermosetting resins.

The thermosetting resin compositions which can be modified in accordance with the present invention may be any of the thermosetting polymer compositions useful in preparing molded articles such as in sheet molding and bulk molding processes. In one embodiment, the thermosetting resin compositions are unsaturated polyester compositions. The unsaturated polyesters are condensation reaction products of an unsaturated polycarboxylic acid and a polyol. The unsaturated polycarboxylic acids which may be condensed with the polyols to produce the unsaturated polyesters can be represented by the formula $$C_nH_{2n-2}(COOH)_2 \tag{III}$$

wherein n is an integer of from about 2 to about 20 and more generally from about 2 to about 10. Examples of such acids include fumaric acid, maleic acid, glutaconic acid, citraconic acid, itaconic acid, ethidenemalonic acid, mesaconic acid, allylmalonic acid, propylidenemalonic acid, hydromaconic acid, pyrocinchonic acid, allyl succinic acid, carbocaprolactonic acid, teraconic acid, xeronic acids, ethylmalonic acid and other like ethylenically unsaturated acids.

Other suitable unsaturated acids include 4-amyl-2,5-heptadienedioic acid, 3-hexenedioic acid, tetrahydrophthalic acid and 3-carboxy cinnamic acid and the like.

If desired, the acid anhydrides of the acids previously described can be used per se or in admixture with the acids to produce the unsaturated polyesters of this invention.

In addition to the anhydrides of the acids noted above, the following acid anhydrides can also be used: pentenyl succinic anhydride, octenyl succinic anhydride, nonenyl succinic anhydride, chloromaleic anhydride, dichloromaleic anhydride, hexachloroendomethylene tetrahydrophthalic anhydride commonly referred to as chloroendic anhydride, the Dieis-Alder adducts of maleic acid and alicyclic compounds having conjugated double bonds such as methylbicyclo-[2,2,1]-heptene-2,3-dicarboxylic anhydride and the like.

If desired, aromatic polycarboxylic acids, saturated polycarboxylic acids, anhydrides thereof or monocarboxylic acids can be used, in conjunction with the unsaturated polycarboxylic acids or the anhydrides thereof, to produce the unsaturated polyesters.

Illustrative of saturated polycarboxylic or aromatic polycarboxylic acids include, among other, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of 22 carbon atoms, are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticica oil, perilla oil, olive oil, safflower oil, sardine oil, soybean oil, tall oil and tung oil (China wood oil).

Illustrative of suitable polyols for purposes of this invention are the dihydric alcohols having the formula $$HO-(CH_2)_m-\underset{R^2}{\overset{R^1}{C}}-(CH_2)_p-OH \qquad (IV)$$

wherein the sum of m+p is at least 1, preferably 1 to 20 inclusive and $R^1$ and $R^2$ which can be the same or different, are hydrogen or alkyl and when alkyl, containing 1 to 20 carbon atoms inclusive. Specific compounds include, among others, ethylene glycol, propylene glycol, butanediol-1,2, butanediol-1,3, butanediol-1,4, hexanediol-1,6, decanediol-1,10 and neopentyl glycol.

Also suitable are the ether diols having the general formula $$HO-(C_nH_{2n}O)_x-H \qquad (V)$$

wherein n has a value of at least 1, preferably 2 to 6 inclusive, and x has a value of at least 2, preferably 2 to 10 inclusive. Among compounds falling within the scope of this formula are diethylene glycol, dipropylene glycol, triethylene glycol and tetraethylene glycol.

Other suitable polyols are the tetrahydric compounds such as pentaerythritol, dipentaerythritol, diglycerol, pentaglycerol, polyvinyl alcohol, etc.

The preparation of unsaturated polyesters can be carried out by methods well known in the art. As a rule, the condensation reaction is conducted by reacting a mixture containing an unsaturated polycarboxylic acid and a polyol, in an amount of about 2 to about 15% in molar excess with respect to the polycarboxylic acid, at temperatures on the order of about 160° C. to about 250° C., preferably about 175° C. to about 225° C., to polyesters having an acid number of less than about 100, generally about 10 to about 60, preferably about 25 to about 50.

The following examples illustrate unsaturated polyester resins of the type which can be modified in accordance with the present invention.

EXAMPLE A

A mixture of 3 moles of maleic acid anhydride, 1 mole of phthalic acid anhydride and 4.4 moles of propylene glycol is prepared and heated to a temperature of about 200° C. The temperature is maintained at 200° C. under a nitrogen atmosphere for about 8 hours. The mixture is cooled and the desired polyester having an acid number of 35 is recovered.

EXAMPLE B

A diethylene dipropylene maleate polyester is prepared in accordance with the general procedure of Example A using 5 moles of diethylene glycol, 5 moles of dipropylene glycol and 10 moles of maleic anhydride.

EXAMPLE C

An unsaturated polyester is prepared by esterifying 1.05 moles of propylene glycol with 1.0 mole of maleic anhydride to an acid number of 52.

EXAMPLE D

The procedure of Example A is repeated utilizing 2.1 moles of propylene glycol, 1.0 mole of phthalic anhydride and 1.0 mole of maleic anhydride. The polymer prepared in this manner has an acid number of about 48.

EXAMPLE E

An unsaturated polymerizable polyester is prepared by esterifying 1.05 moles of 1,3-butanediol with 1.0 mole of maleic anhydride to an acid number of 22.3.

The thermosetting resins which can be modified with the pigmented low profile thermoplastic polymer compositions of the present invention also may be unsaturated vinyl ester resins such as described in, for example, U.S. Pat. No. 3,674,893. The disclosure of this patent relating to vinyl ester resins hereby is incorporated by reference.

The vinyl ester resins are generally prepared by reacting about equivalent proportions of a polyepoxide resin and an unsaturated monocarboxylic acid wherein $$-C(O)OCH_2CH(OH)CH_2O-$$

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid. All of the above-described resins which contain the characteristic linkages $$-C(O)O-CH_2CH(OH)CH_2O-$$

and terminal, polymerizable unsaturated groups, are classified herein as vinyl ester resins. The preparation of vinyl ester resins is fully disclosed in the above patents.

Additionally, it is meant to include within the definition of vinyl ester resins those resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl. A reaction temperature from about 25°–150° C. is suitable and any of the well known vinyl polymerization inhibitors may be added to prevent polymerization during the reaction.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from 2 to 6 carbon atoms.

Useful dicarboxylic acid anhydrides to modify the vinyl ester resin include unsaturated anhydrides such as maleic anhydride, citraconic anhydride, iraconic anhydride, the various substituted maleic anhydrides and the like, as well as a variety of saturated anhydrides such as phthalic anhydride, chlorendic anhydride, tetrabromophthalic anhydride and the like.

The thermosetting resins can also be epoxy resins. Any of the polyepoxy resins mentioned above as being reacted with monocarboxylic acids to form vinyl ester resins can be used per se as thermosetting resins and may be modified with the pigmented thermoplastic polymer compositions of the invention.

In another embodiment, the present invention relates to curable pigmented polymer compositions comprising
 (i) the pigmented thermoplastic polymers prepared as described above, and
 (ii) a polymerizable thermosetting resin.

These curable pigmented polymer compositions may be prepared by adding the pigmented thermoplastic polymer compositions described above to a thermosetting resin by techniques well known in the art. It has been observed that when the color pigments and/or dyes are incorporated into the low profile thermoplastic polymer, in the manner described above, and a slurry is thereafter formed with a copolymerizable monomer, and the slurries are incorporated into thermosetting resins, molded articles prepared from such modified thermosetting resins are characterized by improved properties such as improved surface characteristics, improved uniformity of the pigmentation, reduced haze, and improved color values.

The pigmented polymer compositions generally may contain from about 1 to about 40 parts by weight of the thermoplastic polymer (A), per 100 parts of the combination of thermoplastic polymer, thermosetting resin and the liquid monomer. In one embodiment the weight ratio of thermoplastic polymer to thermosetting polymer in the compositions is from about 2:1 to about 1:25 and more from about 3:2 to about 1:6.

The pigmented polymer compositions of the present invention comprising mixtures of thermosetting and thermoplastic resins may be cured readily by the action of heat alone, and more preferably by exposure to ionizing radiation or by admixture with suitable free radical yielding catalysts. With catalysis, the cure may be accelerated by heating up to 150° C. or higher, and also, if desired, by the addition of accelerating agents.

Among the suitable peroxides that can be used are those which function as free-radical polymerization initiators. Examples of such peroxides are the hydroperoxides such as tert-butyl hydroperoxide, cumene hydroperoxides, paramenthane hydroperoxide and the like; peroxy esters such as di-tert-butyl diperoxyphthalate, tert-butyl peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide, 2,4-dichlorobenzoyl peroxide, lauroyl peroxide and the like.

The amount of peroxide used is sufficient to effect a cross-linking or thermosetting of the composition in a relatively short period of time. As a rule the amount used is about 0.1 to about 5% and preferably about 0.5 to about 2% by weight based on the weight of the unsaturated polyester. The polymerizable thermosetting/thermoplastic compositions of the present invention also may contain other additives commonly used in such polymer systems.

Among suitable thickening agents which can be used are the oxides and hydroxides of metals of Groups I, II and IV of the Periodic Table (Handbook of Chemistry and Physics, 50th edition). Illustrative of specific oxides and hydroxides of the metals noted are the following: magnesium oxide, calcium oxide, zinc oxide, barium oxide, potassium oxide, magnesium hydroxide, calcium hydroxide, and the like.

The thickening agents are used in amounts of about 0.5 to about 75 and preferably in amounts of about 1 to about 5% by weight based on the weight of the unsaturated polyester.

Fillers which are commonly employed in polymer compositions include, among others, glass fibers, clay, calcium carbonate, silica, hydrated alumina and the like. These materials are generally used in amounts of about 20 to about 400% by weight based on the combined weight of the polymers.

The rate of cure of the thermosetting/thermoplastic compositions also may be modified by the addition of suitable inhibitors such as hydroquinone, tertiary butyl catechol, benzaldehyde or tetrachloroquinone and of suitable promoters such as certain amines like dimethyl aniline, diethyl aniline, di-n-propyl analine, dimethyl-para-toluidine, para-diethylaminoazobenzene and dimethyl meta-amino-phenol and metallic salts such as cobalt and manganese naphthenate.

Additional additives such as plasticizers, mold lubricants are usually present in the molding compositions. The amount of the various additional additives included in the thermosetting/thermoplastic polymer compositions are the usual amount consistent with their particular function in the molding composition.

Once formulated, the thermosetting/thermoplastic polymer compositions can be formed into sheets using any suitable apparatus and thereafter molded into thermoset articles of desired shape, particularly thermoset articles such as automobile fenders, dashboards and the like. The formulated compositions of the present invention also may be used in the preparation of molded parts for use in electrical, business machine and power tool applications.

The actual molding cycles will, of course, depend upon the exact composition being molded. Suitable molding cycles are conducted at temperatures on the order of about 250° F. to about 350° F. for periods of time ranging from about 0.5 minute to about 5 minutes.

The thermosetting/thermoplastic compositions of the present invention can be compression molded, transfer molded or injection molded into various shapes by techniques well known to those skilled in the art.

The following examples illustrate the pigmented thermosetting/thermoplastic polymer compositions of the present invention.

EXAMPLE 1

A curable composition is prepared containing the following components:

|  | %/wt. |
|---|---|
| Product of Ex. TP-2 | 14.70 |
| Unsaturated polyester resin | 14.90 |
| Zinc stearate | 1.02 |
| Powdered Polyethylene available from USI | 1.62 |
| Peroxide catalyst | 0.51 |
| Aluminum hydrate | 47.01 |
| Clay | 11.70 |
| Glass fibers | 8.54 |

The above formulation is compression molded into plaques which exhibit improved uniformity of color.

EXAMPLE 2

A curable composition is prepared containing the following components:

|  | %/wt. |
|---|---|
| Product of Ex. TP-5 | 14.7 |
| Unsaturated polyester resin | 15.2 |
| Zinc stearate | 1.40 |
| Cure Promoter PEP-100 (Air Products) | 0.1 |
| Peroxide catalyst | 0.4 |
| Calcium carbonate | 47.1 |
| Glass fibers | 20.0 |
| Thickening agent (MgO) | 1.1 |

The plaques prepared from this formulation exhibit good surface characteristics and improved color.

EXAMPLE 3

A curable formulation is prepared as follows:

|  | Pts./wt. |
|---|---|
| Unsaturated polyester resin | 65.0 |
| Product of Ex. TP-5 | 30.0 |
| Zinc stearate | 4.0 |
| Tertiary-butyl perbenzoate | 1.0 |
| Calcium carbonate | 150.0 |
| Magnesium oxide thickening agent | 2.0 |

EXAMPLE 4

A curable formulation is prepared as follows:

|  | Pts./wt. |
|---|---|
| Unsaturated polyester resin | 15.5 |
| Product of Ex. TP-6 | 13.8 |
| PEP-100 | 0.1 |
| Calcium carbonate | 46.3 |
| Tertiary-butyl perbenzoate | 0.4 |
| Zinc stearate | 1.0 |
| Magnesium oxide thickening agent | 0.9 |
| Chopped glass fibers (1 cm.) | 22.0 |

While the invention has been explained in relation to its preferred embodiments, it is to be understood that the various modifications thereof will become apparent to those skilled in the art upon reading this specification. Therefore, it is to be understood that the invention disclosed herein is intended to cover such modifications as fall within the scope of the appended claims.

I claim:

1. A method of preparing a cured pigmented thermosetting polymer composition exhibiting improved color values and reduced haze which comprises the steps of
   (i) preparing a pigmented thermoplastic polymer composition according to the method comprising the steps of
      (A) selecting at least one thermoplastic polymer having a refractive index which is within about 0.06 units of the refractive index of the thermosetting resin;
      (B) preparing a mixture of said thermoplastic polymer and at least one color pigment, dye or mixture thereof under high shear in a high-intensity mixer; and
      (C) forming a slurry comprising said mixture obtained in step (B) in at least one liquid copolymerizable monomer containing at least one $CH_2=C<$ group, and
   (ii) incorporating said pigmented thermoplastic polymer composition into a polymerizable thermosetting polymer composition and molding and curing the resulting composition to provide a cured pigmented composition exhibiting improved color value and reduced haze.

2. The method of claim 1 wherein the polymerizable pigmented polymer composition contains from about 1 to about 40 parts by weight of thermoplastic polymer per 100 parts of the combination of liquid monomer, thermosetting polymer and thermoplastic polymer.

3. The method of claim 1 wherein the thermosetting polymer composition comprises at least one unsaturated polyester resin.

4. The method of claim 1 wherein the weight ratio of the thermoplastic polymer to thermosetting polymer in the composition is from about 2:1 to about 1:25.

5. A method of preparing a cured pigmented thermosetting polymer composition exhibiting improved color values and reduced haze which comprises the steps of
   (i) preparing a pigmented thermoplastic polymer composition according to the method comprising the steps of
      (A) selecting at least one thermoplastic polymer derived from one or more compounds containing a polymerizable $CH_2=C<$ group and having a refractive index which is within about 0.06 units of the refractive index of the thermosetting resin;

(B) preparing a mixture of said thermoplastic polymer and at least one color pigment, dye or mixture thereof under high shear and under polymer melt conditions in a high-intensity mixer; and (C) preparing a slurry comprising said mixture obtained in step (B), at least one surfactant, and at least one liquid copolymerizable monomer containing a $CH_2=C<$ group in which the thermoplastic polymer can be solubilized or commingled, and (ii) incorporating said pigmented thermoplastic polymer composition into a polymerizable thermosetting polymer composition and molding and curing the resulting composition to provide a cured pigmented composition exhibiting improved color value and reduced haze.

6. The method of claim 1 wherein (D) at least one surfactant is included in the slurry formed in step (C) in an amount sufficient to enhance the uniformity of the pigmentation of the polymer composition when cured.

7. The method of claim 1 wherein the thermoplastic polymer is derived from one or more compounds containing a polymerizable $CH_2=C<$ group.

8. The method of claim 7 wherein at least one thermoplastic polymer is a styrene polymer or copolymer, or a diene homopolymer or copolymer, or mixtures thereof.

9. The method of claim 1 wherein at least one thermoplastic polymer is a butadiene homopolymer or copolymer.

10. The method of claim 1 wherein at least one thermoplastic polymer is a sulfonated polyolefin, chlorosulfonated polyolefin, or mixtures thereof.

11. The method of claim 1 wherein the mixture obtained in step (B) is cooled and pelletized prior to formation of the slurry in step (i)(C).

12. The method of claim 6 wherein (E) additional color pigment is added to the slurry obtained in step (D).

13. The method of claim 1 wherein the mixture prepared in step (B) is prepared in an extruder.

14. The method of claim 1 wherein the liquid polymerizable monomer used in (C) is a styrene.

15. The method of claim 1 wherein the color pigment is carbon black.

16. The method of claim 1 wherein the pigment or dye is prewet with a polyol or a thermosetting resin prior to preparing the mixture in step (i)(B).

17. The method of claim 5 wherein a slurry comprising the mixture of (B) and a liquid copolymerizable monomer is prepared in step (C) and the surfactant or mixture of surfactants is added to the slurry thus formed.

18. The method of claim 5 wherein the thermoplastic polymer comprises at least one polymer or copolymer of 1,3-butadiene.

19. The method of claim 5 wherein at least one nonionic surfactant, cationic surfactant and anionic surfactant are added to the slurry.

20. The method of claim 5 wherein the thermosetting resin composition is a polyester resin composition.

21. The method of claim 5 wherein the mixture obtained in step (B) is cooled and pelletized prior to dissolving in the liquid copolymerizable monomer in step (C).

22. The method of claim 5 wherein the mixture prepared in step (i)(B) is prepared in an extruder.

* * * * *